(12) United States Patent
Kim et al.

(10) Patent No.: US 8,252,465 B2
(45) Date of Patent: Aug. 28, 2012

(54) ELECTROLYTE FOR LITHIUM SECONDARY BATTERY AND LITHIUM SECONDARY BATTERY COMPRISING SAME

(75) Inventors: Jin-Sung Kim, Seoul (KR); Jong-Wook Lee, Cheonan (KR); Kwang-Sik Kim, Cheonan (KR); Young-Gyu Kim, Taejeon (KR); Je-Yun Kim, Taejeon (KR); Jong-Seob Kim, Taejeon (KR); Meen-Seon Paik, Suwon-si (KR); Hak-Soo Kim, Gumi-si (KR)

(73) Assignees: Samsung SDI Co., Ltd., Yongin-si (KR); Ukseung Chemical Co., Ltd., Busan (KR)

( * ) Notice: Subject to any disclaimer, the term of this patent is extended or adjusted under 35 U.S.C. 154(b) by 1358 days.

(21) Appl. No.: 10/718,478

(22) Filed: Nov. 18, 2003

(65) Prior Publication Data

US 2004/0157133 A1     Aug. 12, 2004

Related U.S. Application Data

(63) Continuation-in-part of application No. 09/766,520, filed on Jan. 19, 2001, now abandoned.

(51) Int. Cl.
*H01M 4/40* (2006.01)
*H01M 4/58* (2010.01)

(52) U.S. Cl. ............ 429/326; 429/199; 429/231.8; 429/231.95; 429/332; 429/340

(58) Field of Classification Search .......... None
See application file for complete search history.

(56) References Cited

U.S. PATENT DOCUMENTS

| | | | |
|---|---|---|---|
| 5,290,414 A | 3/1994 | Marple | |
| 5,580,680 A | 12/1996 | Chaloner-Gill et al. | |
| 5,709,968 A | 1/1998 | Shimizu | |
| 5,879,834 A | 3/1999 | Mao | |
| 6,146,790 A | 11/2000 | Omaru et al. | |
| 6,194,099 B1 | 2/2001 | Gernov et al. | |
| 6,245,465 B1 | 6/2001 | Angell et al. | |
| 7,105,250 B2 | 9/2006 | Kim et al. | |
| 7,205,073 B2 | 4/2007 | Kim et al. | |
| 7,223,500 B2 | 5/2007 | Noh et al. | |
| 2001/0009744 A1 | 7/2001 | Kim et al. | |
| 2003/0148190 A1 | 8/2003 | Hamamoto et al. | |
| 2003/0157411 A1 | 8/2003 | Jung et al. | |
| 2003/0190529 A1 | 10/2003 | Kim et al. | |
| 2004/0029018 A1 | 2/2004 | Kim et al. | |

FOREIGN PATENT DOCUMENTS

| | | |
|---|---|---|
| EP | 1 030 399 A1 | 8/2000 |
| JP | 3-152879 | 6/1991 |
| JP | 5-307974 | 11/1993 |
| JP | 6-333596 | 12/1994 |
| JP | 7-176323 | 7/1995 |
| JP | 7-230824 | 8/1995 |
| JP | 7-320779 | 12/1995 |
| JP | 8-64238 | 3/1996 |
| JP | 8-321312 | 12/1996 |
| JP | 9-73918 | 3/1997 |
| JP | 9-147913 | 6/1997 |
| JP | 9-199170 | 7/1997 |
| JP | 09-205041 | 8/1997 |
| JP | 10-189044 | 7/1998 |
| JP | 11-162511 | 6/1999 |
| JP | 11-214001 | 8/1999 |
| JP | 11-329494 | 11/1999 |
| JP | 11-329496 | 11/1999 |
| JP | 2000-106209 | 4/2000 |

(Continued)

OTHER PUBLICATIONS

Official English Translation of JP 11-329494.*

(Continued)

*Primary Examiner* — Robert Hodge
(74) *Attorney, Agent, or Firm* — Christie, Parker & Hale, LLP (57) ABSTRACT

Disclosed is an electrolyte for a lithium secondary battery. The electrolyte includes a non-aqueous solvent and a sulfone based organic compound represented by the following Formulae (I), (II), or (III), or a mixture thereof:

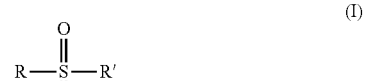

(I)

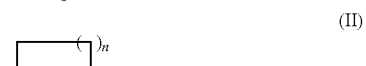

(II)

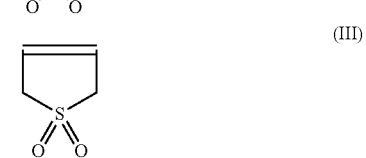

(III)

where R and R' are independently selected from the group consisting of primary alkyl groups, secondary alkyl groups, tertiary alkyl groups, alkenyl groups, aryl groups; halogen substituted primary alkyl groups, halogen substituted secondary alkyl groups, halogen substituted tertiary alkyl groups, halogen substituted alkenyl groups, and halogen substituted aryl groups, and n is from 0 to 3.

12 Claims, 3 Drawing Sheets

FOREIGN PATENT DOCUMENTS

| | | |
|---|---|---|
| JP | 2000-133305 | 5/2000 |
| JP | 2000-294278 | 10/2000 |
| JP | 2000-348763 | 12/2000 |
| JP | 2001-23688 | 1/2001 |
| JP | 2001-57234 | 2/2001 |
| JP | 2001-223024 | 8/2001 |
| JP | 2002-8720 | 1/2002 |
| KR | 2000 2947 | 1/2000 |
| KR | 2000 81253 | 12/2000 |
| WO | WO 99/16144 | 4/1999 |
| WO | WO 99/19932 | 4/1999 |
| WO | WO 99/28987 | 6/1999 |

OTHER PUBLICATIONS

Definition of Alkenes retrived from IUPAC Gold Book Aug. 19, 2010.*
ChemDraw Ultra 12.0 Name to Structure Conversion generated Aug. 19, 2010.*
Structure of Propenyl Sulfone retreived from http://www.lookchem.com on Oct. 26, 2010.*
Megahed et al., "Lithium-ion rechargeable batteries", *Journal of Power Sources* (1994), pp. 79-104, vol. 51.
Yang et al., "Composition analysis of the passive film on the carbon electrode of a lithium-ion battery with an EC-based electrolyte", *Journal of Power Sources* (1998), pp. 66-70, vol. 72.
Patent Abstract of Japan, Publication No. 03-152879, Published on Jun. 28, 1991, in the name of Watanabe Hiroshi, et al.
Patent Abstract of Japan and Patent Application of Japan, Publication No. 05-307974, Published on Nov. 19, 1993, in the name of Yoshida Hiroaki.
Patent Abstract of Japan, Publication No. 06-333596, Published on Dec. 2, 1994, in the name of Yamazaki Mikiya, et al.
Patent Abstract of Japan, Publication No. 07-230824, Published on Aug. 29, 1995, in the name of Yoshida Hiroaki.
Patent Abstract of Japan, Publication No. 08-064238, Published on Mar. 8, 1996, in the name of Uehara Mayumi, et al.
Patent Abstract of Japan, Publication No. 09-073918, Published on Mar. 18, 1997, in the name of Ogawa Terumi, et al.
Patent Abstract of Japan, Publication No. 09-147913, Published on Jun. 6, 1997, in the name of Jinno Maruo, et al.
Patent Abstract of Japan, Publication No. 09-205041, Published on Aug. 5, 1997, in the name of Nishida Kazufumi, et al.
Patent Abstract of Japan, Publication No. 11-214001, Published on Aug. 6, 1999, in the name of Suzuki Takashi, et al.
Patent Abstract of Japan and Patent Application of Japan, Publication No. 11-329494, Published on Nov. 30, 1999, in the name of Hamamoto Shunichi, et al.
Patent Abstract of Japan, Publication No. 2000-133305, Published on May 12, 2000, in the name of Hamamoto Shunichi, et al.
Patent Abstract of Japan, Publication No. 2000-348763, Published on Dec. 15, 2000, in the name of Suzuki Emi, et al.
Patent Abstracts of Japan, Publication No. 09-199170, dated Jul. 31, 1999, in the name of Hiroyoshi Yoshihisa et al.
Patent Abstracts of Japan, Publication No. 11-162511, dated Jun. 18, 1999, in the name of Shoichiro Mori et al.
Patent Abstracts of Japan, Publication No. 2000-294278, dated Oct. 20, 2000, in the name of Akio Hibara et al.
Patent Abstracts of Japan, Publication No. 2001-023688, dated Jan. 26, 2001, in the name of Shunichi Hamamoto et al.
Patent Absracts of Japan, Publication No. 2001-057234 dated Feb. 27 2001 in the name of Akio Hibara.
Patent Abstracts of Japan, Publication No. 2002-008720, dated Jan. 11, 2002, in the name of Takao Nirasawa et al.
Patent Abstracts of Japan, Publication No. 07-176323; Date of Publication: Jul. 14, 1995; in the name of Shuji Kubota.
Patent Abstracts of Japan, Publication No. 07-320779; Date of Publication: Dec. 8, 1995; in the name of Mikiya Yamazaki, et al.
Patent Abstracts of Japan, Publication No. 08-321312; Date of Publication: Dec. 3, 1996; in the name of Maruo Jinno, et al.
Patent Abstracts of Japan, Publication No. 10-189044; Date of Publication: Jul. 21, 1998; in the name of Tokuo Komaru, et al.
Patent Abstracts of Japan, Publication No. 11-329496; Date of Publication: Nov. 30, 1999; in the name of Takashi Hayashi, et al.
Patent Abstracts of Japan, Publication No. 2000-106209; Date of Publication: Apr. 11, 2000; in the name of Takashi Hayashi, et al.
Patent Abstracts of Japan, Publication No. 2001-223024; Date of Publication: Aug. 17, 2001; in the name of Chinsei Kin, et al.

* cited by examiner

ELECTROLYTE FOR LITHIUM SECONDARY BATTERY AND LITHIUM SECONDARY BATTERY COMPRISING SAME

CROSS REFERENCE TO RELATED APPLICATION

This application is a continuation-in-part application of U.S. patent application Ser. No. 09/766,520, filed on Jan. 19, 2001 now abandoned, which claims priority to Application Nos. 2000-2947 and 2000-81253 filed with the Korean Industrial Property Office on Jan. 21, 2000 and Dec. 23, 2000, respectively, and the disclosures of the parent application and the priority documents are incorporated by reference herein in their entireties.

BACKGROUND OF THE INVENTION (a) Field of the Invention

The present invention relates to an electrolyte for a lithium secondary battery and a lithium secondary battery, and more particularly, to an electrolyte for a lithium secondary battery capable of preventing swelling of the battery when the battery is charged at room temperature, or when the battery is stored at a high temperature after charging, and a lithium secondary battery comprising the same.

(b) Description of the Related Art

The use of portable electronic instruments is increasing as electronic equipment gets smaller and lighter due to developments in the high-tech electronic industries. Studies on lithium secondary batteries are actively being pursued in accordance with the increased need for batteries having high energy density for use as power sources in these portable electronic instruments. Lithium-transition metal oxides are often used as positive active materials for lithium secondary batteries, and lithium metals, lithium alloys, crystalline or amorphous carbons, or carbon composites are often used as negative active materials for lithium secondary batteries.

An average discharge voltage of a lithium secondary battery is about 3.6 to 3.7 V, which is higher than other alkali batteries, Ni-MH batteries, Ni—Cd batteries, etc. However, an electrolyte which is electrochemically stable in the charge and discharge voltage range of 0 to 4.2 V is required in order to generate such a high driving voltage. For this reason, mixtures of non-aqueous carbonate based solvents such as ethylene carbonate, dimethyl carbonate, diethyl carbonate, etc. are often used as electrolytes. However, such electrolytes have significantly lower ion conductivity than aqueous electrolytes which are used in Ni-MH batteries or Ni—Cd batteries, thereby resulting in the deterioration of battery characteristics during charging and discharging at high rate.

During the initial charge of a lithium secondary battery, lithium ions, which are released from the lithium-transition metal oxides of a positive electrode of a battery, are transferred to the carbon negative electrode where the ions are intercalated into the carbon. Because of its high reactivity, lithium is reacted with the carbon negative electrode to produce $Li_2CO_3$, $LiO$, $LiOH$, etc., thereby forming a thin film on the surface of the negative electrode. This film is referred to as a solid electrolyte interface (SEI) film. The SEI film formed during the initial charge not only prevents the reaction between lithium ions and the carbon negative electrode or other materials during charging and discharging, but also acts as an ion tunnel, allowing the passage of only lithium ions. The ion tunnel prevents the disintegration of the structure of the carbon negative electrode because organic solvents in an electrolyte with a high molecular weight solvate lithium ions and the solvent and the solvated lithium ion are co-intercalated into the carbon negative electrode.

Once the SEI film is formed, side reactions of the lithium ions with the carbon electrode or other materials are inhibited such that the amount of lithium ions is maintained. That is, the carbon of the negative electrode reacts with the electrolyte during the initial charging, thus forming a passivation layer such as a SEI film on the surface of the negative electrode such that the electrolyte solution is no longer decomposed, and stable charging and discharging are maintained (*J. Power Sources*, 51 (1994), 79-104). For these reasons, in a lithium secondary battery, an irreversible formation reaction of the passivation layer does not occur after the initial charging, and stable cycle life is maintained.

Thin prismatic batteries are problematic in that gases are generated inside such batteries when a carbonate based organic solvent is decomposed during the SEI film forming reaction (*J. Power Sources*, 72 (1998), 66-70). These gases include $H_2$, $CO$, $CO_2$, $CH_4$, $C_2H_6$, $C_3H_8$, $C_3H_6$, etc. depending on the type of non-aqueous organic solvent and negative active material used. The generation of gases can cause a battery to expand during charging. Furthermore, the passivation layer is slowly disintegrated by electrochemical energy and heat energy which increase with the passage of time when the battery is stored at high temperatures after it is charged. Accordingly, a side reaction between the exposed surface of the negative electrode and the surrounding electrolyte occurs continuously. Furthermore, the internal pressure of the battery increases with this generation of gas. The increase in the internal pressure induces the deformation of the prismatic battery and lithium polymer battery (PLI). As a result, regional differences in the cohesion between pole plates inside an electrode element (positive and negative electrode, and separator) of the battery occur, thereby deteriorating the performance and stability of the battery and making the mounting of the lithium secondary battery difficult.

As a method for solving the internal pressure problem, there is disclosed a method in which the stability of a secondary battery including a non-aqueous electrolyte is improved by mounting a vent or a current breaker for ejecting an internal electrolyte solution when the internal pressure is increased above a certain level. However, a problem with this method is that mis-operation may be caused by an increase in internal pressure itself.

Furthermore, a method is known in which the SEI formation reaction is changed by injecting additives into an electrolyte so as to inhibit the increase in internal pressure. For example, Japanese Patent Laid-open Publication No. 97-73918A discloses a method in which the high temperature storage characteristics of a battery are improved by adding a diphenyl picrylhydrazyl compound of 1% or less to the electrolyte. Japanese Patent Laid-open Publication No. 96-321312A discloses a method in which cycle life and long term storage characteristics are improved using a N-butyl amine group compound of 1 to 20% in an electrolyte. Japanese Patent Laid-open Publication No. 96-64238A discloses a method in which storage characteristics of a battery are improved by adding $3 \times 10^{-4}$ to $3 \times 10^{-3}$ M of calcium salt to the electrolyte. Japanese Patent Laid-open Publication No. 94-333596A discloses a method in which the storage characteristics of a battery are improved by adding an azo compound to inhibit the reaction between an electrolyte and a negative electrode of the battery.

Such methods as described above for inducing the formation of an appropriate film on a negative electrode surface such as a SEI film by adding a small amount of organic or inorganic materials are used in order to improve the storage characteristics and stability of a battery. However, there are various problems with these methods: the added compound can decompose or form an unstable film by interacting with the carbon negative electrode during initial charging and discharging according to inherent electrochemical characteristics, resulting in the deterioration of the ion mobility in an electrode; and gas generated inside the battery can cause an increase in internal pressure, resulting in significant worsening of the storage characteristics, stability, cycle life, and capacity of the battery.

SUMMARY OF THE INVENTION

In an embodiment of the present invention an electrolyte is provided for a lithium secondary battery including a sulfone based organic compound which is capable of inhibiting the generation of gas inside the battery caused by the decomposition of a carbonate based organic solvent during initial charging.

In another embodiment of the present invention a lithium secondary battery is provided that undergoes almost no variation in thickness when the battery is charged at room temperature or when the battery is stored at a high temperature after charging.

The present invention provides an electrolyte for a lithium secondary battery. The electrolyte includes a non-aqueous organic solvent and a sulfone based organic compound selected from the group consisting of compounds represented by the following Formulae (I), (II), and (III), and mixtures thereof:

where R and R' are independently selected from the group consisting of primary alkyl groups, secondary alkyl groups, tertiary alkyl groups, alkenyl groups, aryl groups; halogen substituted primary alkyl groups, halogen substituted secondary alkyl groups, halogen substituted tertiary alkyl groups, halogen substituted alkenyl group, and halogen substituted aryl groups, and n is from 0 to 3.

The present invention further provides a lithium secondary battery including the electrolyte, a positive electrode including lithium-transition metal oxides as a positive active material and a negative electrode including carbon, carbon composite, lithium metal, or lithium alloy as a negative active material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

An electrolyte of the present invention is prepared by adding a sulfone based organic compound to a non-aqueous carbonate based organic solvent. A sulfone based organic compound represented by the following Formulae (I), (II), or (III), or a mixture thereof can be used in the present invention:

where R and R' are independently selected from the group consisting of primary alkyl groups, secondary alkyl groups, tertiary alkyl groups, alkenyl groups, aryl groups; halogen substituted primary alkyl groups, halogen substituted secondary alkyl groups, halogen substituted tertiary alkyl groups, halogen substituted alkenyl group, and halogen substituted aryl groups, and n is from 0 to 3. Preferably, each of R and R' are an alkyl group of $C_1$ to $C_4$, an alkenyl group of $C_2$ to $C_4$, an aryl group of $C_6$ to $C_{14}$, a substituted alkyl group of $C_1$ to $C_4$, a substituted alkenyl group of $C_2$ to $C_4$, or a substituted aryl group of $C_6$ to $C_{14}$, and the substituent is preferably halogen selected from the group consisting of fluoro, chloro, bromo, and iodo. Specific examples of a sulfone based organic compound preferably used in the present invention include methyl sulfone, vinyl sulfone, phenyl sulfone, 4-fluorophenyl sulfone, benzyl sulfone, tetramethylene sulfone, and butadiene sulfone.

A sulfone based organic compound is added to a non-aqueous organic solvent in an amount of 0.1 to 10 weight %, and preferably 0.1 to 5 weight % of the total amount of the electrolyte. The effect of inhibiting the generation of gas inside a battery is not likely when the sulfone based organic compound is used in an amount of less than 0.1 weight %. Initial charge and discharge efficiencies and a cycle life performance of the battery are decreased in accordance with the increase in the amount of compound used when the sulfone based organic compound is used in an amount exceeding 10 weight %.

The sulfone based organic compound is decomposed earlier than a carbonate based organic solvent during initial charging to react with lithium ions resulting in the formation of a SEI film, thereby inhibiting the decomposition of the carbonate based organic solvent. Therefore, swelling of a prismatic battery or lithium polymer battery can be prevented during charging at room temperature or during high temperature storage after charging since the generation of gas caused by the decomposition of the carbonate based organic solvent is inhibited during initial charging.

A carbonate based organic solvent such as a cyclic or linear carbonate, or a mixture of two or more solvents can be used as a non-aqueous organic solvent in the present invention. Specific examples of the non-aqueous organic solvent include ethylene carbonate (EC), dimethyl carbonate (DMC), diethyl carbonate (DEC), methylethyl carbonate (MEC), dipropyl carbonate (DPC), methylpropyl carbonate (MPC), ethylpropyl carbonate (EPC), methylisopropyl carbonate, ethylbutyl carbonate, diisopropyl carbonate, dibutyl carbonate, propylene carbonate (PC), and butylene carbonate (BC), but they are not limited thereto.

Lithium hexafluorophosphate ($LiPF_6$), lithium tetrafluoroborate ($LiBF_4$), lithium perchlorate ($LiClO_4$), lithium trifluoromethanesulfonate ($CF_3SO_3Li$), lithium hexafluoroarsenate ($LiAsF_6$), or a mixture thereof is added to the electrolyte as a supporting salt. These provide a source of lithium ions, making the basic operation of a lithium secondary battery possible.

An electrolyte for a lithium secondary battery of the present invention is stable in the temperature range of −20 to 60° C., and can maintaining stable characteristics even at a voltage of 4 V. An electrolyte of the present invention can be applied to all lithium secondary batteries including a lithium ion battery, lithium polymer battery, etc.

Lithium-transition metal oxides such as $LiCoO_2$, $LiNiO_2$, $LiMnO_2$, $LiMn_2O_4$, or $LiNi_{1-x-y}Co_xM_yO_2$ (wherein $0 \leq x \leq 1$, $0 \leq y \leq 1$, $0 \leq x+y \leq 1$, and M is a metal such as Al, Sr, Mg, La, etc.) are used as a positive active material, and crystalline or amorphous carbon such as mesocarbon fiber (MCF), carbon composite, lithium metal, or lithium alloy is used as a negative active material in a lithium secondary battery of the present invention.

A lithium secondary battery is manufactured by placing the electrode element into a can or similar container and then injecting a non-aqueous electrolyte solution to which the sulfone based organic compound is added into the can or container after preparing the electrode groups by coating the active material to a suitable thickness and length on a collector of a thin plate or coating the active material itself in a form of film. Subsequently, the coated material or film is rolled up or laminated along with a dielectric separator. Resin films such as polyethylene, polypropylene, etc. can be used as the separator.

According to one example of the present invention, an electrolyte of a lithium secondary battery comprises a non-aqueous organic solvent and vinyl sulfone which is present in an amount of more than 0.05 wt % and less than or equal to 0.5 wt % of the total weight of electrolyte, preferably 0.2 to 0.5 wt %, and more preferably 0.3 to 0.5 wt %. When the vinyl sulfone is used in the aforementioned amount, initial capacity, discharge capacity at low temperature, and cycle life characteristics at a high rate as well as the swelling inhibition properties are improved over when the vinyl sulfone is used outside of the range. The improved high rate characteristics make quick charge-discharge possible.

The non-aqueous organic solvent may be a mixed solvent of a cyclic carbonate and linear carbonate. The cyclic carbonate and the linear carbonate are preferably mixed together in a volume ratio of 1:1 to 1:9. When the cyclic carbonate and the linear carbonate are mixed in the volume ratio of 1:1 to 1:9, and the mixture is used as an electrolyte, the electrolyte performance may be enhanced.

In addition, the non-aqueous organic solvent may be a mixture of the carbonate solvents and aromatic hydrocarbon solvents of Formula (IV):

(IV)

wherein R1 is a halogen or a $C_1$ to $C_{10}$ alkyl, and n is an integer from 0 to 6, preferably 1 to 5.

Examples of aromatic hydrocarbon solvents include benzene, chlorobenzene, nitrobenzene, fluorobenzene, toluene, trifluorotoluene, and xylene. The carbonate solvents and the aromatic hydrocarbon solvents are preferably mixed together in a volume ratio of 1:1 to 30:1. When a carbonate solvent and an aromatic hydrocarbon solvent are mixed with each other in the aforementioned volume ratio, and the mixture is used as an electrolyte, the electrolyte performance may be enhanced.

It is preferable to use cyclic carbonate, linear carbonate, and aromatic hydrocarbon solvents which are mixed in a volume ratio of 10-40:40-80:5-40.

The electrolyte of the present invention further includes gamma butyrolactone in an amount of 10 to 30 parts per volume on the basis of 100 parts per volume of the non-aqueous organic solvent. The gamma butyrolactone inhibits gas generation from carbonate based organic solvents. However, when gamma butyrolactone is used in an amount of 30 parts per volume, cycle life characteristics are deteriorated.

The following Examples further illustrate the present invention in detail but are not to be construed to limit the scope thereof.

Examples 1 to 10

Electrolytes of Examples 1 to 10 were prepared by adding 1 M of $LiPF_6$ to a non-aqueous organic solvent in which ethylene carbonate (EC) and dimethyl carbonate (DMC) are mixed in a volume ratio of 1:1, and then adding sulfone based organic compounds as shown in the Table 1 to the solvent.

TABLE 1

|  | Sulfone based organic compound | Added amount (weight %) |
| --- | --- | --- |
| Example 1 | Methyl sulfone | 2 |
| Example 2 | Vinyl sulfone | 2 |

TABLE 1-continued

|  | Sulfone based organic compound | Added amount (weight %) |
|---|---|---|
| Example 3 | Phenyl sulfone | 2 |
| Example 4 | 4-Fluorophenyl sulfone | 2 |
| Example 5 | Butadiene sulfone | 2 |
| Example 6 | Tetramethylene sulfone | 2 |
| Example 7 | Vinyl sulfone | 1 |
| Example 8 | Vinyl sulfone | 5 |
| Example 9 | Phenyl sulfone | 1 |
| Example 10 | 4-Fluorophenyl sulfone | 1 |

Comparative Example 1

1 M of $LiPF_6$ was added to a non-aqueous organic solvent in which ethylene carbonate (EC) and dimethyl carbonate (DMC) are mixed in a volume ratio of 1:1 to prepare an electrolyte for a rechargeable lithium battery.

Measuring of Decomposition Voltage

Decomposition voltages of the electrolytes of the Examples 1 to 6 and Comparative example 1 were measured by a cyclic voltametry process. The results are represented in the following Table 2.

TABLE 2

|  | Decomposition voltage(V) |
|---|---|
| Example 1 | 0.6 |
| Example 2 | 1.3 |
| Example 3 | 1.1 |
| Example 4 | 1.06 |
| Example 5 | 0.6 |
| Example 6 | 0.8 |
| Comparative Example 1 | 0.5 |

The conditions for measuring the cyclic voltages were as follows:

Working electrode: MCF, reference electrode: Li-metal, counter electrode: Li-metal, voltage range: 3 V to 0 V, scan rate: 0.1 mV/s The electrolytes of Examples 1 to 6 to which sulfone based organic compounds were added have higher decomposition voltages than the electrolyte of Comparative example 1 to which the sulfone based organic compounds are not added. Accordingly, the electrolytes of Example 1 to 6 decompose earlier during initial charging, and a SEI film forming reaction occurs at the decomposition voltage.

Manufacturing of Lithium Secondary Batteries

After mixing $LiCoO_2$ as a positive active material, polyvinylidenefluoride (hereinafter referred to as "PVDF") as a binder, and acetylene black as a conductive agent in a weight ratio of 92:4:4, a positive slurry was prepared by dispersing the mixture into N-methyl-2-pyrrolidone. The slurry was coated on a 20 μm thick aluminum foil, dried, and compressed, thereby manufacturing a positive electrode. After mixing crystalline artificial graphite as a negative active material with PVDF as a binder in a weight ratio of 92:8, a negative slurry was prepared by dispersing the mixture into N-methyl-2-pyrrolidone. The slurry was coated on a 15 μm thick copper foil, dried, and compressed, thereby manufacturing a negative electrode. Together with a 25 μm thick polyethylene separator, the manufactured electrodes were wound, and pressed, then placed into prismatic cans having the dimensions of 30 mm×48 mm×6 mm. Each of the electrolytes of the Examples 1 to 10 and Comparative example 1 were injected into the cans, thereby completing the manufacture of the batteries. The cells had a nominal capacity of 800 mAh.

Thickness Variations in the Batteries after Charging

The lithium secondary batteries, which were manufactured by injecting the electrolyte solutions of the Examples 1 to 10 and Comparative example 1, were charged with an electric current of 160 mA to a charge voltage of 4.2 V under the condition of CC-CV then allowing the batteries to sit for 1 hour, and the batteries were discharged to 2.5 V with an electric current of 160 mA and left to sit for 1 hour. After repeating this procedure 3 times, the batteries were charged with an electric current of 600 mA to a charge voltage of 4.2 V for 2 hours and 30 minutes. The rates of increase in the thicknesses of the batteries after charging (relative to the thicknesses measured after assembly of the batteries) are represented in the Table 3.

TABLE 3

|  | Thickness variation of battery after charging |
|---|---|
| Example 1 | 6.9% |
| Example 2 | 3.4% |
| Example 3 | 5.3% |
| Example 4 | 3.6% |
| Example 5 | 6.4% |
| Example 6 | 7.4% |
| Example 7 | 4.5% |
| Example 8 | 3.4% |
| Example 9 | 6.1% |
| Example 10 | 4.5% |
| Comparative Example 1 | 7.9% |

Thickness Variations of the Batteries During High Temperature Storage after Charging The lithium secondary batteries, which were manufactured by injecting the electrolytes of the Examples 1 to 6, 9 and 10 and Comparative example 1, were placed in a chamber of high temperature (85° C.) for 4 days and the thicknesses of the batteries were measured every 24 hours. The rates of increase in the thicknesses of the batteries (relative to the thicknesses measured after assembly) are represented in the following Table 4.

TABLE 4

|  | 4 hours | 24 hours | 48 hours | 72 hours | 96 hours |
|---|---|---|---|---|---|
| Example 1 | 17.2% | 20.9% | 23.3% | 27.3% | 31.4% |
| Example 2 | 7.9% | 12.6% | 16.7% | 21.1% | 25.5% |
| Example 3 | 17.8% | 25.3% | 27.6% | 29.7% | 31.9% |
| Example 4 | 7.8% | 15.3% | 21.6% | 23.7% | 25.9% |
| Example 5 | 17.6% | 22.8% | 27.2% | 30.2% | 33.1% |
| Example 6 | 17.4% | 20.7% | 22.1% | 26.3% | 30.5% |
| Example 9 | 17.6% | 22.8% | 27.2% | 30.2% | 33.1% |
| Example 10 | 8.9% | 20.6% | 23.2% | 25.1% | 28.5% |
| Comparative Example 1 | 22.9% | 28.1% | 30.9% | 33.2% | 35.5% |

It is evident from the Tables 3 and 4 that the increases in thickness of the lithium secondary batteries into which the electrolytes of Examples 1 to 6, 9 and 10 were injected is substantially less than that of the lithium secondary battery into which the electrolyte solution of Comparative example 1 was injected.

Cycle Life Characteristics

Figure 1:
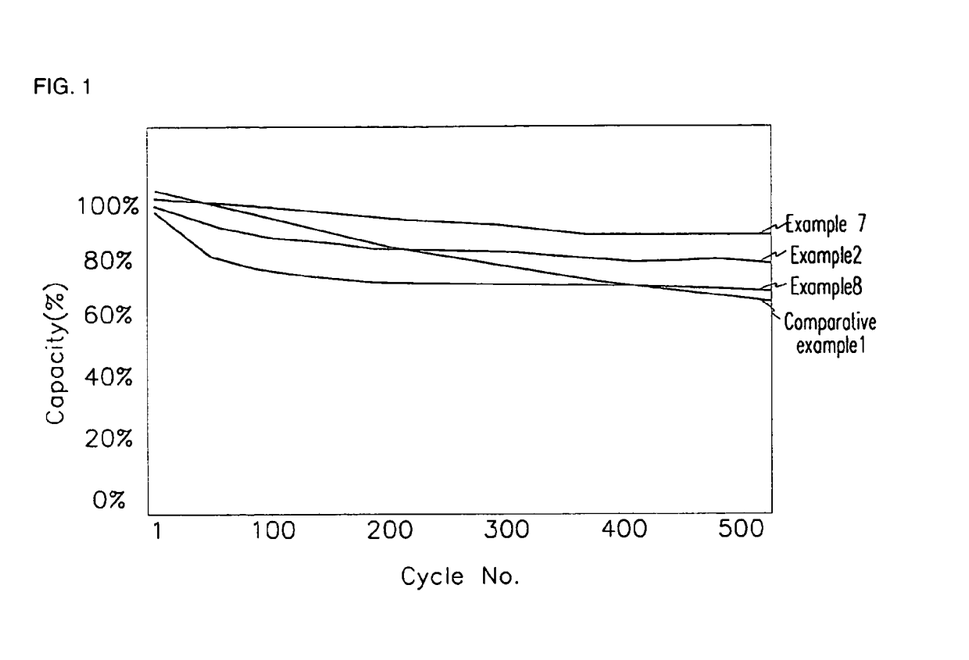
FIG. 1 is a graph illustrating cycle life characteristics of the cells according to Examples 2, 7 and 8 and Comparative Example 1 of the present invention.

The lithium secondary batteries, which were manufactured by injecting the electrolyte solutions of the Examples 2, 7 and 8 and Comparative example 1, were charged at 1 C rate to a charge voltage of 4.2 V under the condition of CC-CV, and the batteries were discharged at 1 C to 2.75 V. The cycle life characteristics of the cells according to Examples 2, 7 and 8, and Comparative example 1 were measured and the results are shown in FIG. 1. As shown in FIG. 1, the capacity of the cell of Comparative example 1 is significantly reduced during the charge and discharge cycles, but that of Examples 2, 7 and 8 is nearly not reduced. Accordingly, the cycle life characteristics of the cells of Examples 2, 7 and 8 are better than those of Comparative example 1.

In order to evaluate electrochemical characteristics according to the content of vinyl sulfone, electrolytes including vinyl sulfone in amounts of 0.1, 0.3, 0.5, 1, and 2 wt % on the basis of total weight of electrolyte respectively were used. The test battery cells were manufactured in the same manner as above. The cells had a nominal capacity of 800 mAh.

Figure 2:
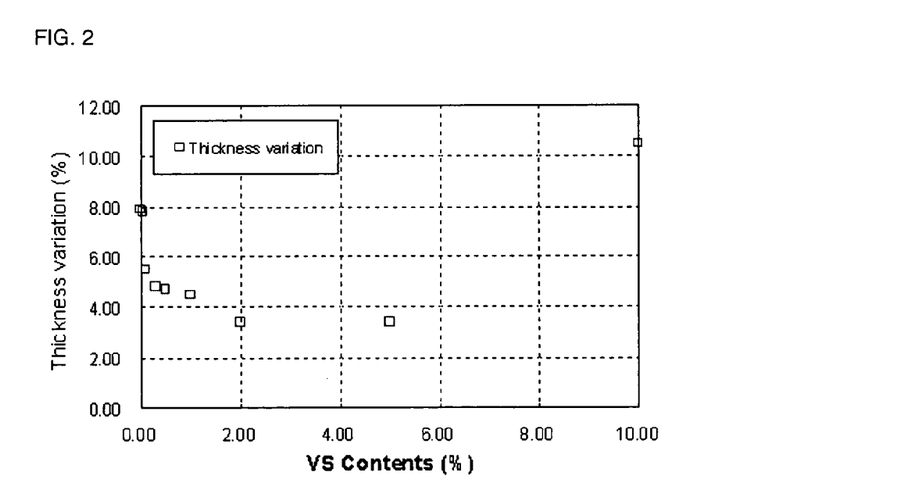
FIG. 2 is a graph illustrating a thickness variation ratio of cells according to the content of vinyl sulfone.

The test battery cells were charged with an electric current of 160 mA to a charge voltage of 4.2 V under the condition of CC-CV, then the batteries were allowed to sit for 1 hour, after which they were discharged to 2.5 V with an electric current of 160 mA and left to sit for 1 hour. After repeating this procedure 3 times, the batteries were charged with an electric current of 600 mA to a charge voltage of 4.2 V over 2 hours and 30 minutes. The rates of increase in the thicknesses of the batteries after charging (relative to the thicknesses measured after assembly of the batteries) are shown FIG. 2. As shown in FIG. 2, the thickness variation ratios are low when the content of vinyl sulfone is in the range of 0.1 to 5 wt %.

Figure 3:
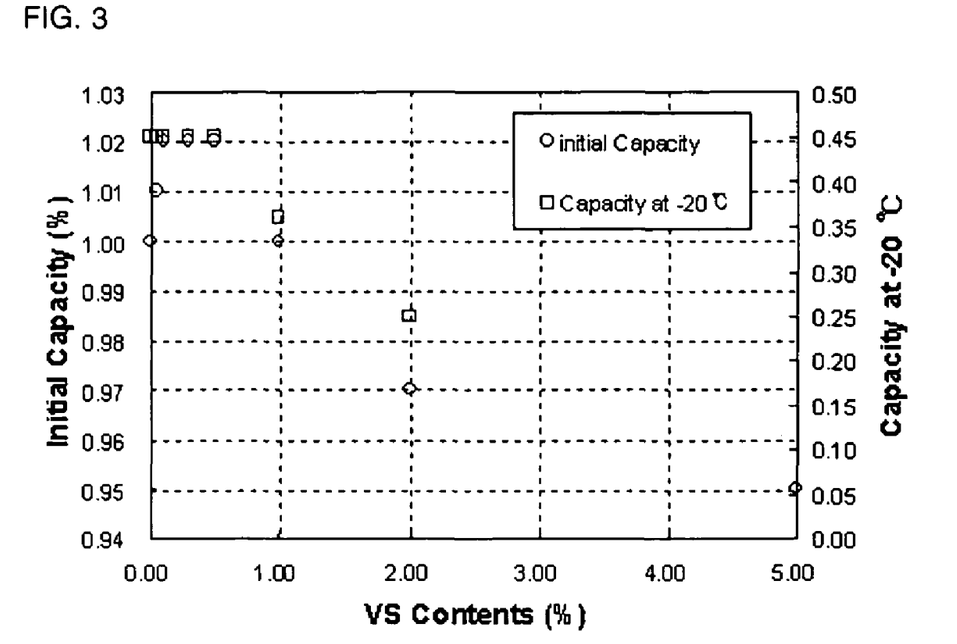
FIG. 3 is a graph illustrating initial capacity and low temperature discharge capacity of cells according to vinyl sulfone content.

The initial capacity was measured as follows: battery cells were charged at 0.5 C under constant current and constant voltage for 2 hours and 30 minutes, and then discharged at 0.2 C under constant current to a cut-off voltage of 2.75V. The low temperature characteristics were measured as follows: battery cells were charged at 0.5 C under constant current and constant voltage for 2 hours and 30 minutes, placed at 20° C. for 4 hours, and then discharged at 0.5 C under constant current to a cut-off voltage of 3V. The measured initial capacity and low temperature characteristics are shown in FIG. 3. As shown in FIG. 3, the initial capacity and low temperature characteristics were more improved when the content of vinyl sulfone was in the range of 0.1 to 0.5 wt % than when the content was out of this range.

Figure 4:
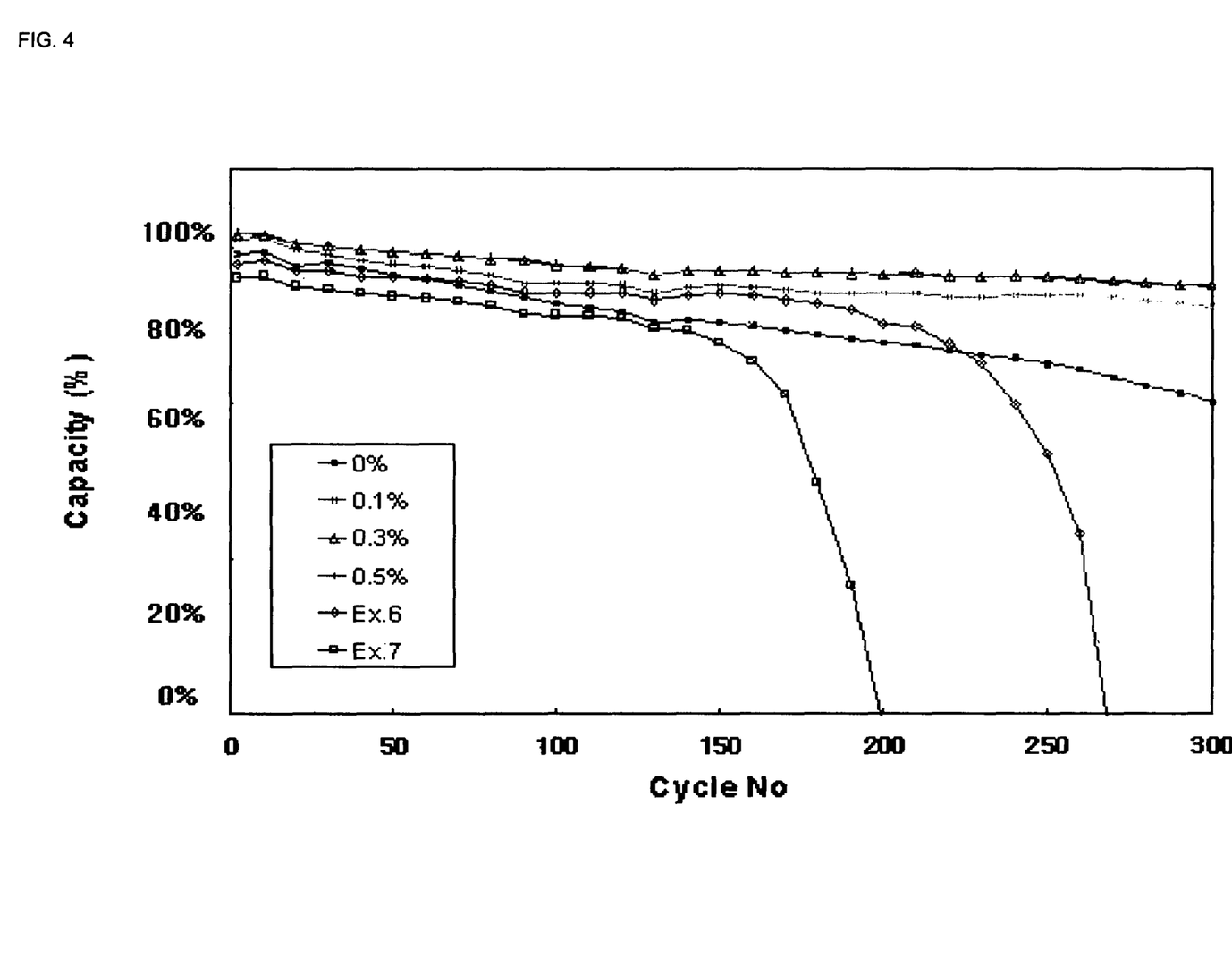
FIG. 4 is a graph illustrating cycle life characteristics at a high rate of cells according to the content of vinyl sulfone.

The cycle life characteristics at high rate were measured as follows: battery cells were charged at 1.5 C under constant current and constant voltage for 2 hours, and then discharged at 2 C under constant current to a cut-off voltage of 3V. The measurement results are shown in FIG. 4. As shown in the FIG. 4, cycle life characteristics at a high rate when the vinyl sulfone was used in the range of 0.1 to 0.5 wt % are more improved than when it was used out of the range. It is expected that when the vinyl sulfone is used in an amount of more than or equal to 1 wt %, impedance of the battery increases and therefore the low temperature characteristic and high rate capacity are deteriorated.

In order to evaluate the synergistic effect of gamma butyrolactone (GBL) and vinyl sulfone (VS), the electrolytes were prepared as shown in Table 5. A mixed solvent of ethylene carbonate/ethylmethyl carbonate/dimethyl carbonate/fluorobenzene (EC/EMC/DMC/FB) in a volume ratio of 3:5:1:1 was used as an organic solvent. The test battery cells were manufactured using the electrolyte in the same manner as above. The cells had a nominal capacity of 800 mAh. The thickness variation ratio, initial capacity, and cycle life characteristics (capacity retention) were measured as in measurement of properties according to content of vinyl sulfone. The measurement results are shown in Table 5.

TABLE 5

| Amount of GBL (parts per volume) | Amount of Vinylene carbonate (wt %) | Amount of Vinyl sulfone (wt %) | Thickness variation of battery after charging (%) | Initial capacity (%) | Capacity Retention at 100th cycle (%) |
|---|---|---|---|---|---|
| 10 | — | — | 5.8 | 98 | 10% |
| — | 0.5 | — | 7.5 | 100 | 95% |
| — | — | 0.5 | 4.7 | 102 | 95% |
| 10 | 0.5 | — | 6.0 | 101 | 93% |
| 10 | — | 0.5 | 3.8 | 102 | 95% |
| — | 0.5 | 0.5 | 4.0 | 102 | 95% |
| 10 | 0.5 | 0.5 | 3.5 | 102 | 95% |

Note: the initial capacity is a relative value with respect to that of Comparative Example 1.

As shown in Table 5, when both gamma butyrolactone and vinyl sulfone are used together, the thickness variation decreases significantly, and initial capacity and capacity retention are more improved compared to when they were used independently.

Sulfone based organic compound added to an electrolyte of the present invention is decomposed earlier than a carbonate based organic solvent during initial charging, thus forming a SEI film to inhibit a carbonate based organic solvent from being decomposed. Therefore, a lithium secondary battery to which the electrolyte of the present invention is applied decreases the internal pressure of batteries and prevents the thickness of batteries from increasing during charging at room temperature or during high temperature storage after charging. That is, these effects are realized by inhibiting the generation of gas caused by the decomposition of the carbonate based organic solvent during initial charging.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a lithium secondary battery comprising:
   a non-aqueous organic solvent comprising at least one cyclic carbonate, at least one linear carbonate, and at least one aromatic hydrocarbon solvent;
   a sulfone based compound selected from the group consisting of compounds represented by Formulae (I), (II), (III) and mixtures thereof:

where R and R' are independently selected from the group consisting of primary alkyl groups, secondary alkyl groups, tertiary alkyl groups, aryl groups, alkenyl groups; halogen substituted primary alkyl groups, halogen substituted secondary alkyl groups, halogen substituted tertiary alkyl groups, halogen substituted alkenyl groups, and halogen substituted aryl groups, and n is from 0 to 3;

where the sulfone based compound is present in an amount from 0.3 to 0.5 wt % on the basis of total weight of the electrolyte; and gamma butyrolactone in an amount from 10 to 30 parts per volume on the basis of 100 parts per volume of the non-aqueous organic solvent.

2. The electrolyte for a lithium secondary battery according to claim 1, wherein the aromatic hydrocarbon solvent is a compound represented by Formula (IV):

(IV)

wherein R1 is a halogen or a $C_1$ to $C_{10}$ alkyl, and n is an integer from 0 to 6.

3. The electrolyte for a lithium secondary battery according to claim 2, wherein the aromatic hydrocarbon solvent is selected from the group consisting of benzene, chlorobenzene, nitrobenzene, fluorobenzene, toluene, trifluorotoluene, xylene and mixtures thereof.

4. The electrolyte for a lithium secondary battery according to claim 1, wherein the aromatic hydrocarbon solvent is a compound represented by Formula (IV) and the cyclic carbonate, linear carbonate, and aromatic hydrocarbon solvent are mixed in a volume ratio of 10-40:40-80:5-40:

(IV)

wherein R1 is a halogen or a $C_1$ to $C_{10}$ alkyl, and n is an integer from 0 to 6.

5. The electrolyte for a lithium secondary battery according to claim 1, wherein the non-aqueous organic solvent comprises ethylene carbonate and a linear carbonate selected from the group consisting of dimethyl carbonate (DMC), diethyl carbonate (DEC), methylethyl carbonate (MEC) and mixtures thereof.

6. An electrolyte for a lithium secondary battery comprising:
a non-aqueous organic solvent comprising at least one cyclic carbonate, at least one linear carbonate, and at least one aromatic hydrocarbon solvent represented by Formula (IV), wherein the cyclic carbonate, linear carbonate and aromatic hydrocarbon solvent represented by Formula (IV) are mixed in a volume ratio of 10-40:40-80:5-40;

(IV)

wherein R1 is a halogen or a $C_1$ to $C_{10}$ alkyl, and n is an integer from 0 to 6;

gamma butyrolactone in an amount from 10 to 30 parts per volume on the basis of 100 parts per volume of the non-aqueous organic solvent; and a sulfone based compound in an amount from 0.05 to 0.5 wt % on the basis of total weight of the electrolyte, the sulfone based compound being selected from the group consisting of compounds represented by Formulae (I), (II), (III) and mixtures thereof:

(I)

(II)

(III)

where R and R' are independently selected from the group consisting of primary alkyl groups, secondary alkyl groups, tertiary alkyl groups, aryl groups, alkenyl groups; halogen substituted primary alkyl groups, halogen substituted secondary alkyl groups, halogen substituted tertiary alkyl groups, halogen substituted alkenyl groups, and halogen substituted aryl groups, and n is from 0 to 3;

wherein the sulfone based compound is present in an amount from 0.3 to 0.5 wt % on the basis of total weight of the electrolyte.

7. An electrolyte for a lithium secondary battery comprising:
a non-aqueous organic solvent comprising at least one cyclic carbonate, at least one linear carbonate, and at least one aromatic hydrocarbon solvent;
a sulfone based organic compound selected from the group consisting of methyl sulfone, phenyl sulfone, 4-fluorophenyl sulfone, benzyl sulfone, tetramethylene sulfone, butadiene sulfone, compounds represented by the following Formula (I), and mixtures thereof:

(I)

where R and R' are independently selected from the group consisting of alkenyl groups, and halogen substituted alkenyl groups, wherein the sulfone based organic compound is present in an amount from 0.3 to 0.5 wt % on the basis of total weight of the electrolyte; and gamma butyrolactone in an amount from 10 to 30 parts per volume on the basis of 100 parts per volume of the non-aqueous organic solvent.

8. The electrolyte for a lithium secondary battery according to claim 7, wherein the halogen is selected from the group consisting of fluoro, chloro, bromo, and iodo.

9. A lithium secondary battery comprising:

an electrolyte comprising:

a non-aqueous organic solvent comprising at least one cyclic carbonate, at least one linear carbonate, and at least one aromatic hydrocarbon solvent;

a sulfone based organic compound selected from the group consisting of methyl sulfone, phenyl sulfone, 4-fluorophenyl sulfone, benzyl sulfone, tetramethylene sulfone, butadiene sulfone, compounds represented by the following Formula (I), and mixtures thereof, wherein the sulfone based organic compound is present in an amount from 0.3 to 0.5 wt % on the basis of total weight of the electrolyte; and gamma butyrolactone in an amount from 10 to 30 parts per volume on the basis of 100 parts per volume of the non-aqueous organic solvent;

a positive electrode including lithium-transition metal oxides as a positive active material; and a negative electrode including carbon, carbon composite, lithium metal, or lithium alloy as a negative active material:

(I)

where R and R' are independently selected from the group consisting of alkenyl groups, and halogen substituted alkenyl groups.

10. An electrolyte for a lithium secondary battery comprising:

a non-aqueous organic solvent comprising at least one cyclic carbonate, at least one linear carbonate, and at least one aromatic hydrocarbon solvent;

a sulfone based organic compound selected from the group consisting of methyl sulfone, phenyl sulfone, 4-fluorophenyl sulfone, benzyl sulfone, tetramethylene sulfone, butadiene sulfone, compounds represented by the following Formulae (I), (II), and (III), and mixtures thereof:

(I)

(II)

(III)

where R and R' are independently selected from the group consisting of primary alkyl groups, secondary alkyl groups, tertiary alkyl groups, aryl groups, alkenyl groups; halogen substituted primary alkyl groups, halogen substituted secondary alkyl groups, halogen substituted tertiary alkyl groups, halogen substituted alkenyl groups, and halogen substituted aryl groups, and n is from 0 to 3, wherein the amount of the sulfone based organic compound is from 0.3 to 0.5 weight % based on the total amount of electrolyte; and gamma butyrolactone in an amount from 10 to 30 parts per volume on the basis of 100 parts per volume of the non-aqueous organic solvent.

11. The electrolyte for a lithium secondary battery according to claim 10, wherein the halogen is selected from the group consisting of fluoro, chloro, bromo, and iodo.

12. A lithium secondary battery comprising:

an electrolyte comprising:

a non-aqueous organic solvent comprising at least one cyclic carbonate, at least one linear carbonate, and at least one aromatic hydrocarbon solvent;

a sulfone based organic compound selected from the group consisting of methyl sulfone, phenyl sulfone, 4-fluorophenyl sulfone, benzyl sulfone, tetramethylene sulfone, butadiene sulfone, compounds represented by the following Formulae (I), (II), and (III), and mixtures thereof; and gamma butyrolactone in an amount from 10 to 30 parts per volume on the basis of 100 parts per volume of the non-aqueous organic solvent;

a positive electrode including lithium-transition metal oxides as a positive active material; and a negative electrode including carbon, carbon composite, lithium metal, or lithium alloy as a negative active material:

(I)

(II)

(III)

where R and R' are independently selected from the group consisting of primary alkyl groups, secondary alkyl groups, tertiary alkyl groups, aryl groups, alkenyl groups; halogen substituted primary alkyl groups, halogen substituted secondary alkyl groups, halogen substituted tertiary alkyl groups, halogen substituted alkenyl groups, and halogen substituted aryl groups, and n is from 0 to 3, wherein the amount of the sulfone based organic compound is from 0.3 to 0.5 weight % based on the total amount of electrolyte.

* * * * *